United States Patent [19]

Maeda et al.

[11] Patent Number: 4,745,498
[45] Date of Patent: May 17, 1988

[54] CASSETTE TYPE VIDEO TAPE RECORDER HAVING A SELECTIVELY POSITIONED TAPE LOADER

[75] Inventors: Masaya Maeda; Hiroyuki Takimoto, both of Kanagawa, Japan

[73] Assignee: Canon Kabushiki Kaisha, Tokyo, Japan

[21] Appl. No.: 844,226

[22] Filed: Mar. 24, 1986

Related U.S. Application Data

[63] Continuation of Ser. No. 467,378, Feb. 17, 1983, abandoned, which is a continuation of Ser. No. 204,872, Nov. 7, 1980, abandoned.

[30] Foreign Application Priority Data

Nov. 16, 1979 [JP] Japan .................. 54-148665

[51] Int. Cl.⁴ .................................... G11B 5/027
[52] U.S. Cl. .......................... 360/85; 360/95
[58] Field of Search ............ 360/85, 95, 84, 83, 360/93; 242/199, 200

[56] References Cited

U.S. PATENT DOCUMENTS

| | | | |
|---|---|---|---|
| 3,678,217 | 7/1972 | Kihara | 360/95 |
| 3,792,491 | 2/1974 | Inaga | 360/85 |
| 3,864,742 | 2/1975 | Katoh | 360/85 |
| 3,939,491 | 2/1976 | Shigeta | 360/85 |
| 4,074,329 | 2/1978 | Sakumoto et al. | 360/85 |
| 4,115,825 | 9/1978 | Hayashi et al. | 360/85 |
| 4,121,267 | 10/1978 | Hayashi | 360/95 |
| 4,138,699 | 2/1979 | Ura et al. | 360/85 |
| 4,258,399 | 3/1981 | Iijima et al. | 360/85 |
| 4,264,937 | 4/1981 | Kabacinski | 360/85 |

FOREIGN PATENT DOCUMENTS 2719768 5/1977 Fed. Rep. of Germany .
128314 4/1978 Japan .

Primary Examiner—Stuart N. Hecker
Assistant Examiner—David J. Severin
Attorney, Agent, or Firm—Fitzpatrick, Cella, Harper, and Scinto

[57] ABSTRACT

This specification discloses a cassette type video tape recorder provided with a tape loader for drawing out a tape from a loaded tape cassette and bringing the tape into contact with the tape guiding surface of an image recording and reproducing portion provided with an image recording and reproducing head. The tape loader being capable of being stopped at a third position between a first position for drawing out the tape from the loaded tape cassette and a second position in which the drawn-out tape is in contact with the tape guiding surface of the image recording and reproducing portion.

15 Claims, 9 Drawing Sheets

CASSETTE TYPE VIDEO TAPE RECORDER HAVING A SELECTIVELY POSITIONED TAPE LOADER

This application is a continuation of application Ser. No. 467,378 filed Feb. 17, 1983, now abandoned, which in turn is a continuation of U.S. Ser. No. 204,872, filed Nov. 7, 1980, now abandoned.

BACKGROUND OF THE INVENTION

1. Field of the Invention

This invention relates to a cassette type video tape recorder, and more particularly to a cassette type video tape recorder provided with tape loading means for drawing out a tape from a loaded tape cassette and bringing the tape into contact with the tape guiding surface of an image recording and reproducing portion which is provided with an image recording and reproducing head.

2. Description of the Prior Art

Such a cassette type video tape recorder is well-known. In the video tape recorder of such type, the aforementioned tape loading means is changeable over between a first position for drawing out a tape from a loaded tape cassette and a second position in which the drawn out tape is in contact with the tape guiding surface of the image recording and reproducing portion. By setting the tape loading means from the first position to the second position, the tape is drawn out from the tape cassette loaded into the recorder and is appropriately loaded with respect to the image recording and reproducing portion.

This will hereinafter be considered in respect to known actual video tape recorders. There is a video tape recorder designed such that when, for example, the image recording mode button or the reproducing mode button of the recorder is operated, the image recording and reproducing rotatable magnetic head and tape moving capstan in the image recording and reproducing portion are rotated. While, at the same time, a tape loading device is actuated and tape loading means is set from the first position to the second position, whereby a tape is drawn out from within a tape cassette and loaded with respect to the image recording and reproducing portion. Upon completion of this tape loading, a pinch roller is urged against a capstan with the tape interposed therebetween, whereby movement of the tape is started to effect the image recording or reproduction. There is also a video tape recorder designed such that when, for example, a tape cassette is loaded into the recorder, a tape loading device is actuated in relation thereto and tape loading means is set from the first position to the second position. A tape is drawn out from within the tape cassette and loaded with respect to the image recording and reproducing portion and subsequently, when the image recording mode button or the reproducing button of the recorder is operated, the image recording and reproducing rotatable magnetic head and tape moving capstan in the image recording and reproducing portion are rotated. While, at the same time, a pinch roller is urged against a capstan with the tape interposed therebetween, whereby movement of the tape is started to effect the image recording or reproduction.

These two recorders will now be compared. In the former recorder, before the pinch roller is urged against the capstan, the capstan and the image recording and reproducing magnetic head are rotated. This leads to an advantage that the rising of tape movement at the start of image recording or reproduction is good and reduces the disturbance of the recorded image or the reproduced image immediately after the start of the image recording or reproduction. While, on the other hand, the tape loading is effected by operation of the image recording mode button or the reproducing mode button. This leads to a disadvantage that a relatively long time is required after the operation of each mode button until the image recording or reproduction is actually effected. In contrast, in the latter recorder, the tape loading is effected in relation to the loading of the tape cassette into the recorder. Thus, the above-described disadvantage peculiar to the former recorder is eliminated while, on the other hand, the pressure contact of the pinch roller with the capstan takes place simultaneously with the rotation of the image recording and reproducing magnetic head and capstan by the operation of the image recording mode button or the reproducing mode button. This leads to a defect in the rising of tape movement particularly at the start of the image recording or reproduction, which in turn leads to a disadvantage that the recorded image or the reproduced image immediately after the start of the image recording or reproduction is liable to be disturbed.

A case where tape fast forward or tape fast rewind is effected in the image recording or the reproducing mode will now be considered. In the former recorder, when a tape fast forward button or a tape fast rewind button is operated, the tape loading device is actuated and the tape loading means is returned from the second position to the first position. Accordingly, tape fast forward or tape fast rewind is effected in an unloading condition in which the tape is contained in the tape cassette. According to this, the tape is fast forwarded or fast rewound in a condition in which it is contained in the cassette and without being brought into contact with members such as the recorder side magnetic head, guide post, etc. This leads to an advantage that there occurs no problem such as abrasion or damage of the magnetic surface of the tape or abrasion of the recorder side magnetic head while, on the other hand, a relatively long time is required from after the tape fast forward button or the tape fast rewind button has been operated until tape fast forward or tape fast rewind is actually started. This leads to a disadvantage that a long time is required in effecting the so-called recorded image search. On the other hand, in the latter recorder, tape fast forwarding or tape fast rewind is effected with the tape not being contained in the tape cassette but loaded with respect to the image recording and reproducing portion. According to this, the above-noted disadvantage peculiar to the former is eliminated, but the tape is rapidly moved while in the loading condition. This means that there is unreasonable movement of the tape which in turn means dilation of the tape occurs. Moreover, in this case, the image recording and reproducing rotatable magnetic head continues to rotate. This leads to the occurrence of a problem such as abrasion or damage of the magnetic surface of the tape or abrasion of the magnetic head which is a great factor for greatly deteriorating the durability of the tape and the head.

The two recorders will be further considered with respect to the condition in which they are used with a video camera. In such case, in both of the two recorders, by operating the recorder side image recording mode button, various operations necessary for the image recording, except the pressure contact of the pinch roller with the capstan, are effected in advance to set the recorder into the image recording stand-by condition. In this condition, by the trigger-on on the camera side, the pinch roller is urged against the capstan to start movement of the tape, whereby image recording is carried out by the output from the camera. Generally, in photographing, various operations such as decision of the composition, zooming, focusing, aperture adjustment, etc. are effected on the camera side and a very long time is spent until the camera is triggered on. Also, the trigger-off of the camera is frequently effected and, during the time that the camera is in trigger-off condition, the tape is in contact with the rotating image recording and reproducing magnetic head in the image recording and reproducing portion. This leads to the readiness with which an inconvenience such as abrasion or damage of the magnetic surface of the tape or abrasion of the image recording and reproducing magnetic head occurs. To avoid such inconvenience, design may be made such that, for example, the operations such as setting of the recorder to the image recording mode, namely, rotation of the image recording and reproducing magnetic head and capstan, tape loading and pressure contact of the pinch roller with the capstan, are all effected by the trigger-on position on the camera side, but in that case a long time will be required from after the trigger-on of the camera until image recording is actually started on the recorder side. Accordingly, there will occur an inconvenience such as missing the photographing chance.

On the other hand, to avoid the above-noted inconvenience during the tape fast forward or the tape fast rewind which is particularly peculiar to the former, there is a video tape recorder in which, with respect to the tape loading means, provision is made of movable tape guide means entirely separate therefrom. This tape guide means is made changeable over from a position in which it is advanced to this side of the image recording and reproducing portion (head cylinder portion) to a position in which it is retracted rearwardly of the image recording and reproducing portion. During the tape fast forward or the tape fast rewind, the tape guide means is changed over from its retracted position to its advanced position with the tape loading means remaining set to the second position, namely, the tape loading position, whereby the tape is not contained in the cassette but is spaced apart from the image recording and reproducing portion. In this condition, the tape fast forward or the tape fast rewind is effected (this is conceptionally disclosed in Japanese Laid-open Pat. application No. 128314/1978, for example), and if this is utilized, it may be expected that the above-noted inconveniences can be eliminated. Accordingly, the construction of the movable tape guide means and a special mechanism for controlling it, are required in addition to the usual tape loading device. Accordingly, the construction of the mechanism system becomes more complicated and further, the necessity of securing a movable space for the tape guide means adjacent to the image recording and reproducing portion (head cylinder portion) gives rise to unreasonableness in the layout of various mechanism portions and construction means. This leads to the entire apparatus becoming bulky and thus the desire for compactness of the apparatus is hampered greatly.

SUMMARY OF THE INVENTION

The present invention has been made in view of the above-noted situation. An object thereof is to provide a more advantageous cassette type video tape recorder which eliminates the above-noted inconveniences peculiar to the prior art, while avoiding the disadvantages resulting from providing additionally special movable tape guide means with respect to the tape loading means. The present invention consists of a cassette type video tape recorder provided with tape loading means for drawing out a tape from a loaded tape cassette and bringing the tape into contact with the tape guiding surface of an image recording and reproducing portion provided with an image recording and reproducing head. The recorder is characterized in that the tape loading means can be stopped at a third position between a first position for drawing out the tape from the loaded tape cassette and a second position in which the drawn out tape is in contact with the tape guiding surface of the image recording and reproducing portion.

That is, according to such cassette type video tape recorder of the present invention, as is proposed in an embodiment which will hereinafter be described, the tape loading means is set from the first position to the third position, for example, in relation to the loading of the tape cassette into the recorder. By operation of an image recording mode button or a reproducing mode button or during the use of the recorder with a video camera, by the trigger-on on the camera side, the tape loading means is set from the third position to the second position. Further, during the tape fast forward or the tape fast rewind, the tape loading means is set to the third position, thereby clearing away the above-noted inconveniences peculiar to the prior art.

The above and other objects and advantages of the present invention will become apparent from the following detailed description taken in conjunction with the accompanying drawings.

DESCRIPTION OF THE PREFERRED EMBODIMENTS

Figure 1:
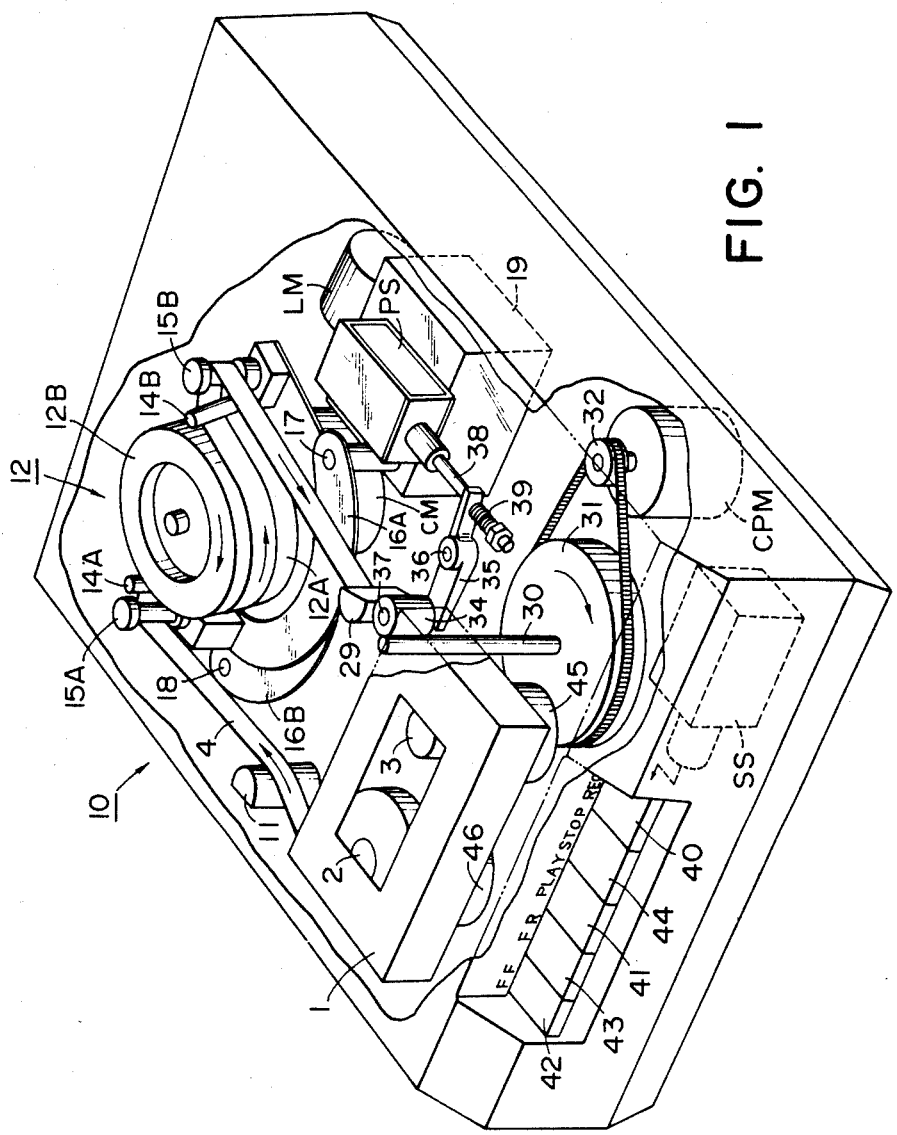
FIG. 1 is a perspective view showing the construction of the essential portions of an embodiment of the present invention which is particularly related to the invention.
Figure 2A:
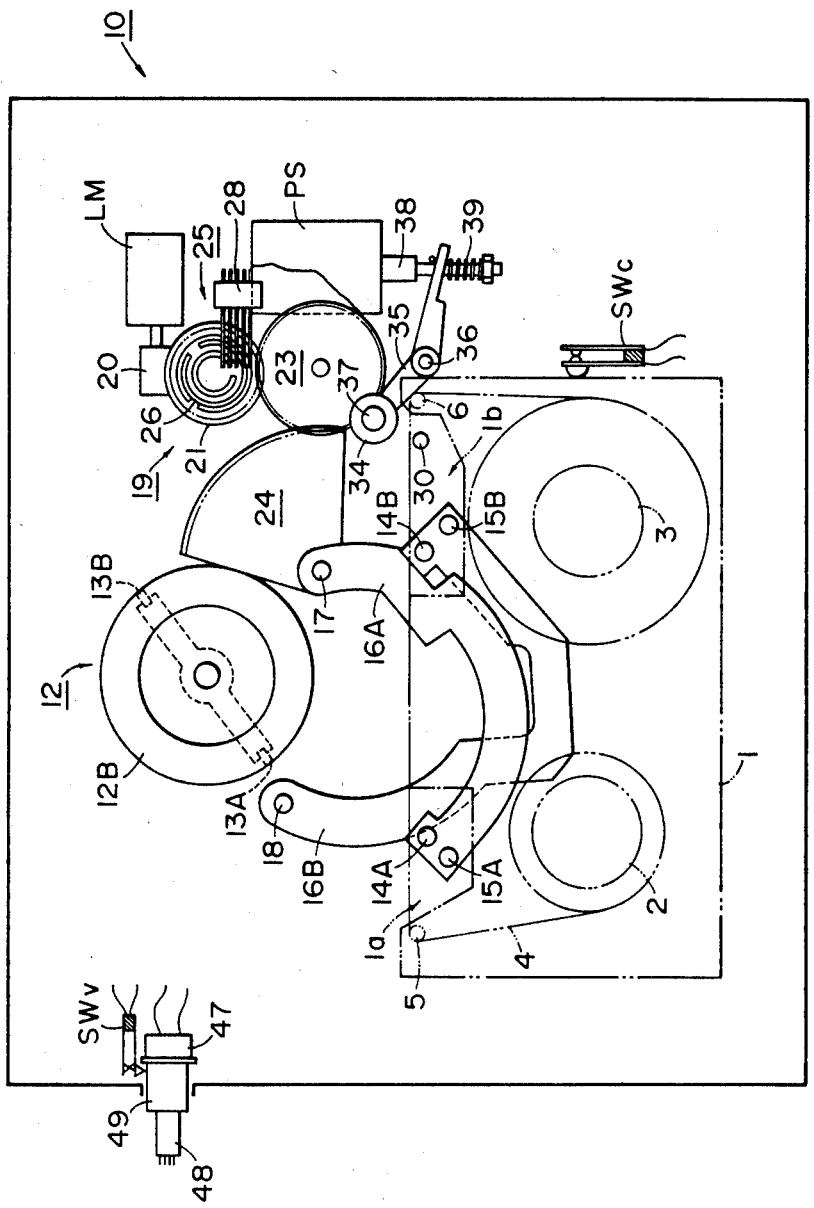
FIGS. 2(A), (B) and (C) are views illustrating the operations of the essential portions in the various set conditions of the tape loading means in the video tape recorder shown in FIG. 1, FIG. 2(A) showing the tape unloading condition, FIG. 2(B) showing the tape preloading condition, and FIG. 2(C) showing the tape loading condition.
Figure 2B:
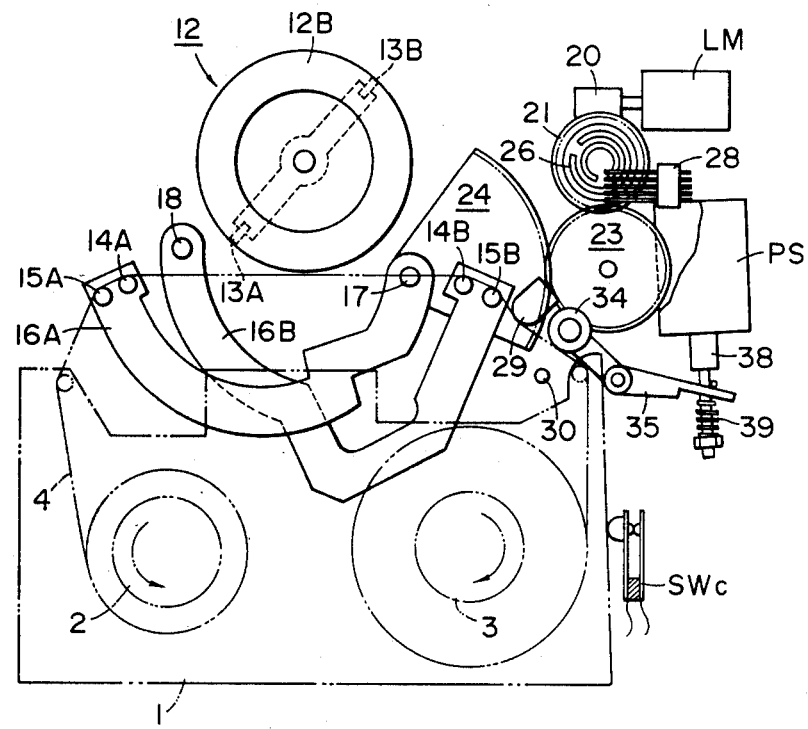
Figure 2C:
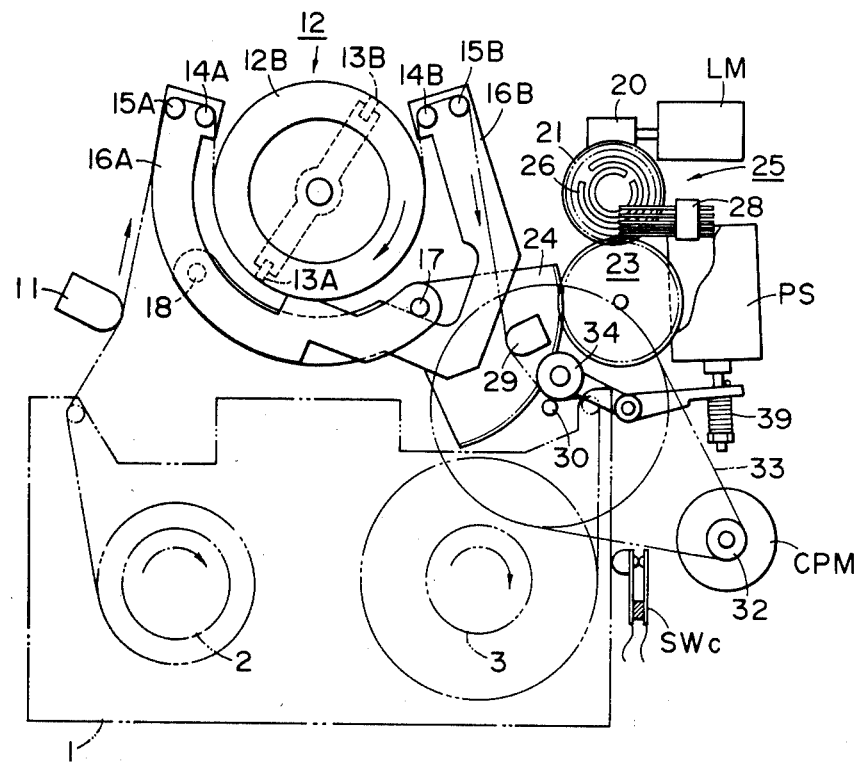
Figure 3:
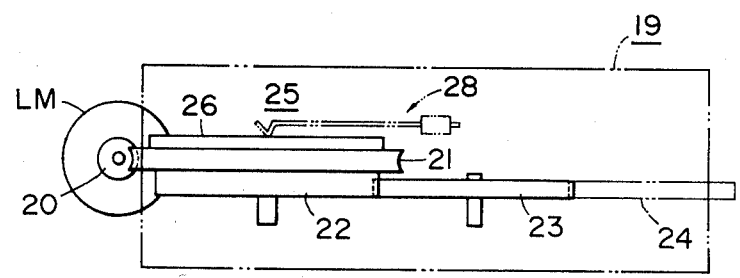
FIG. 3 is a side view showing the internal construction of the tape loading mechanism block in FIG. 1.
Figure 4A:
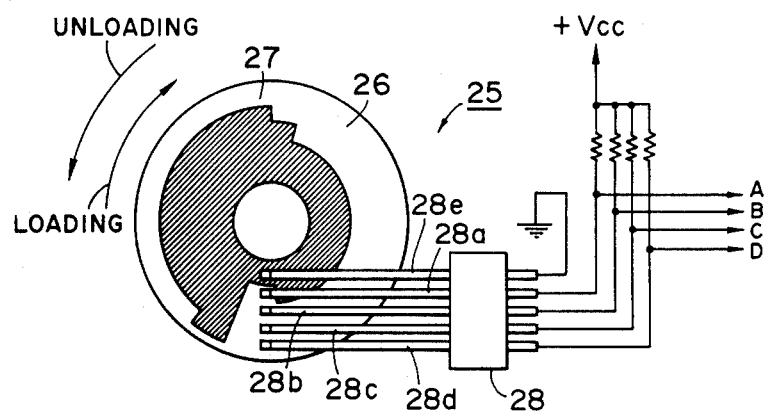
FIG. 4(A) is a plan view showing the details of position detecting means for detecting the displaced position of the tape loading means.
Figure 4B:
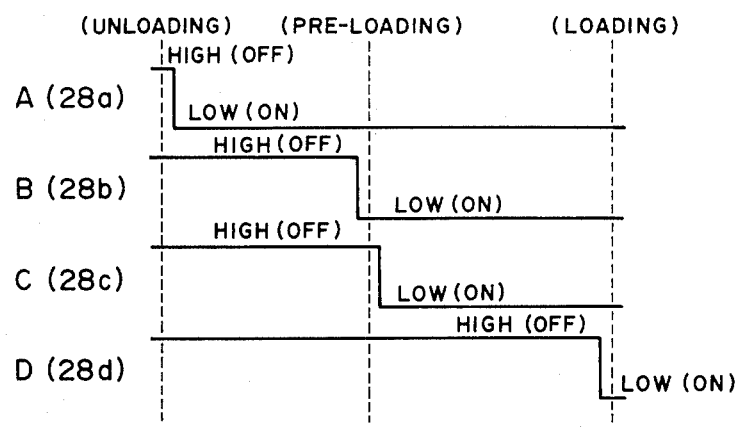
FIG. 4(B) shows the output form of the position detecting mean.

Referring first to FIG. 1, reference numeral 10 generally designates a video tape recorder, reference numeral 1 denotes a tape cassette loaded into the video tape recorder, reference numeral 2 designates the tape supply side core of the tape cassette, reference numeral 3 denotes the tape take-up side core of the tape cassette, and reference numeral 4 designates a tape. Reference numeral 11 denotes an entire width erasing head, and reference numeral 12 designates a head cylinder portion as an image recording and reproducing portion. The head cylinder portion 12 comprises, for example, a fixed lower cylinder 12A disposed so that the axis thereof is oblique with respect to the chassis of the recorder body as is well-known, and a rotatable upper cylinder 12B. As shown in FIGS. 2(A)–(C), the upper cylinder 12B is equipped with image recording and reproducing rotatable magnetic heads 13A and 13B diametrically opposed to each other and projected from between the upper cylinder 12B and the lower cylinder 12A, and these may be driven with the upper cylinder 12B by a cylinder motor CM. As is well-known, the outer peripheral surface of the lower cylinder 12A is formed with a tape leading stepped portion and a tape guide surface, and the outer peripheral surface of the upper cylinder 12B is likewise formed with a tape guide surface, and the tape 4 is brought into contact with the tape guide surfaces by a mechanism which will later be described. Reference characters 14A, 14B and 15A, 15B respectively designate inclined pins and upright tape guide posts forming tape loading means including a movable member. The inclined pin 14A and the guide post 15A are studded on the fore end portion of a movable member, such as a loading arm 16A supported at the tail end thereof by a rotary shaft 17, and the inclined pin 14B and the guide post 15B are studded on the fore end portion of another movable member, such as a loading arm 16B supported at the tail end thereof by a rotary shaft 18 and operatively associated with the loading arm 16A by a suitable connecting mechanism, not shown. The inclined pins 14A and 14B have inclinations corresponding to the inclinations of the axes of the cylinders 12A and 12B and, as shown in FIG. 1, the tape 4 is relatively obliquely wound on the gap portion of the lower and upper cylinders 12A and 12B over a range of $180+a°$. LM designates a loading motor for driving a tape loading mechanism, and 19 denotes a tape loading mechanism block for pivotally moving the loading arms 16A and 16B by the drive force of the motor LM. As shown in FIGS. 2(A)–(C) and FIG. 3, the tape loading mechanism block 19 has a worm wheel 21 meshing with the output worm gear 20 of the motor LM, a gear 22 integral with the worm wheel 21, an intermediate gear 23 meshing with the gear 22, and a sector gear 24 meshing with the intermediate gear 23 and connected to the shaft 17 of the loading arm 16A at the center of rotation thereof, and is designed such that when the motor LM is rotated in forward direction, the sector gear 24 is clockwise rotated thereby and at this time, the loading arm 16A is also pivoted clockwise and the loading arm 16B is pivoted counter-clockwise. When the motor LM is rotated in reverse direction, the sector gear 24 is rotated counter-clockwise and at this time, the loading arm 16A is also pivoted counter-clockwise and the loading arm 16B is pivoted clockwise. As will be understood from the above-described construction, by the clockwise and counter-clockwise pivotal movements of the loading arms 16A and 16B, the inclined pin 14A and the guide post 15A and the inclined pin 14B and the guide post 15B are moved from a first position (hereinafter referred to as the unloading position) shown in FIG. 2(A) wherein they come from the cut-aways 1a and 1b of the loaded tape cassette 1 into the cassette 1 and are positioned at the back side of the tape stretched between the tape guide pins 5 and 6 in the cassette 1 toward a second position (hereinafter referred to as the loading position) shown in FIGS. 1 and 2(C) wherein they are positioned slightly rearwardly of the center of the cylinders 12A, 12B so that the tape 4 is drawn out from the cassette 1 and wound on substantially one-half of the outer periphery of the cylinders 12A, 12B (namely, the range of $180+a°$), and by the counter-clockwise and clockwise pivotal movements of these loading arms 16A and 16B, said inclined pins and said guide posts are moved from the loading position toward the unloading position. In the present embodiment, during the movement of the inclined pin 14A, the guide post 15A, the inclined pin 14B and the guide post 15B from the unloading position to the loading position and from the loading position to the unloading position, the worm wheel 21 makes substantially one full rotation (within at least one full rotation) in clockwise direction and counter-clockwise direction, respectively. In FIGS. 2(A)–(C) and 3, reference numeral 25 designates position detecting means for detecting the moved positions of the inclined pins 14A, 14B and the guide posts 15A, 15B. This position detecting means 25 comprises a printed disc 26 having a conductor pattern 27 as shown in FIG. 4(A) and fixed to the upper surface of the worm wheel 21, and a detecting brush 28 having five conductive contact pieces 28a, 28b, 28c, 28d and 28e arranged as shown with respect to the printed disc 26, and among the five conductive contact pieces 28a–28e of the detecting brush 28, the conductive contact piece 28e is grounded by an earth contact piece, and 28a–28d are detecting contact pieces to which a voltage Vcc is imparted, and with respect to these contact pieces 28a–28e, the conductor pattern 27 on the printed disc 26 is formed so that, in the range of rotation of the worm gear 21 corresponding to the movement of the inclined pins 14A, 14B and the guide posts 15A, 15B between said unloading position and said loading position, the high and low signals as shown in FIG. 4(B) are respectively produced at the output ends A, B, C and D of the detecting contact pieces 28a, 28b, 28c and 28d. Here, the word "pre-loading" refers to a condition in which the inclined pin 14A, the guide post 15A, the inclined pin 14B and the guide post 15B are in a third position (hereinafter referred to as the pre-loading position) between said unloading position and said loading position, as shown in FIG. 2(B) wherein the tape 4 drawn out from the cassette 1 is not brought into contact with the cylinders 12A and 12B short thereof and outside of the cassette 1 but is urged against only a control signal and audio signal recording and reproducing head. Incidentally, FIG. 4(A) corresponds to the unloading condition. Although not shown, the loading arms 16A and 16B are adapted to be latched for the proper positioning of the inclined pins 14A, 14B and the guide posts 15A, 15B at the loading position thereof by suitable releasable means in the loading position of the inclined pin 14A, the guide post 15A, the inclined pin 14B and the guide post 15B shown in FIGS. 1 and 2(C). Designated by 30 is a tape moving capstan disposed so as to come into the tape cassette 1 through the cut-away 1b thereof during the loading of the tape cassette 1 and be thereby positioned at the back side of the tape 4 stretched between guide rollers 5 and 6. The capstan 30 has a fly-wheel 31 attached thereto, and the fly-wheel 31 may be rotatively driven through a belt 33 stretched between it and the output pulley 32 of a capstan motor CPM. A pinch roller 34 is provided for urging the tape 4 against the capstan 30 to move the tape, and is rotatably supported by a shaft 37 on one end of a pin roller arm 35 pivotally supported by a shaft 36, the other end of the arm 35 being connected to a coil spring 39 mounted on the fore end of the armature rod 38 of a pinch roller urging solenoid PS. Reference numeral 40 designates an image recording mode button, 41 denotes a reproducing mode button, 42 designates a tape fast forward mode button, 43 denotes a tape fast rewind mode button, and 44 designates a stop button. These are well-known piano key type push buttons and, as is well-known, except the stop button 44, the mode buttons 40-43 are adapted to be latched in their respective depressed positions by unshown latch means. Designated by SS is a latch releasing stop solenoid responsive to the depression of the stop button 44 to release the latching of the mode buttons 40, 41, 42, 43 in their depressed positions by said latch means. Reference numeral 45 designates tape take-up drive means, and 46 denotes tape rewind drive means. These are connected to a tape core driving motor TCM (see FIG. 5C) through an electromagnetic clutch, and are designed to be connected to the tape take-up side core 3 and the tape supply side core 2, respectively, of the tape cassette 1 during loading of the cassette 1.

In FIGS. 2(A)-(C), $SW_c$ designates a cassette loading detecting switch adapted to be closed in response to the loading of the tape cassette into the recorder side cassette loading portion. Also, in FIG. 2(A), reference numeral 47 denotes a jack into which the plug 49 of a camera cable 48 is inserted during the use of the recorder with a video camera, not shown, and $SW_v$ designates a camera use detecting switch adapted to be closed in response to the insertion of the plug 49 into the jack 47.

Figure 5:
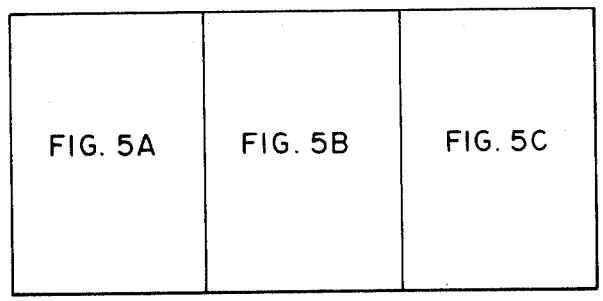
FIGS. 5(A)–(C) illustrate a circuit diagram showing the logic construction of the electric circuit system of this embodiment of the present invention which is particularly concerned with the operation control.

Reference is now made to FIG. 5 to describe an electric circuit system for controlling the operations of the operating portions of the video tape recorder constructed as described above.

In FIG. 5, switches will first be described. $SW_v$ and $SW_c$ are the above-described camera use detecting switch and cassette loading detecting switch (shown in FIG. 2(A)). Reference numerals 27 and 28a-28d designate the conductor pattern of the printed disc 26 in the aforementioned position detecting means 25 and the detecting contact pieces (shown in FIG. 4(a)) of the brush 28. $SW_R$ designates an image recording mode switch adapted to be closed by depression of the image recording mode button shown in FIG. 1. SWp designates a reproducing mode switch adapted to be closed by depression of the reproducing mode button 41. $SW_{FF}$ denotes a tape fast forward mode switch adapted to be closed by depression of the tape fast forward mode button 42. $SW_{FR}$ designates a tape fast rewind mode switch adapted to be closed by depression of the tape fast rewind mode button 43. SWs denotes a stop switch adapted to be closed by depression of the stop button 44. $SW_T$ denotes a video camera side trigger switch adapted to be connected to the recorder 10 by insertion of the plug 49 of the camera cable 48 into the recorder side jack 47. These switches and contact pieces are connected between the plus side of the power source and the earth as shown, and accordingly, high level signals are obtained upon opening of these switches and contact pieces, and low level signals are obtained upon closing thereof.

The logic circuit for these switches will now be described. $IV_1$ designates an inverter for obtaining the ON-OFF signal of the cassette loading detecting switch SWc at an inverted logic, $IV_{14}$ denotes an inverter for obtaining the output of an AND gate $G_3$ to be described at an inverted logic, $G_1$ designates an AND gate for taking the logic product of the outputs of the inverters $IV_1$ and $IV_{14}$ and the ON-OFF signal of the detecting contact piece 28b, $IV_2$ denotes an inverter for obtaining the ON-OFF signal of the reproducing mode switch $SW_p$ at an inverted logic, $IV_3$ designates an inverter for obtaining the ON-OFF signal of the image recording mode switch $SW_R$ at an inverted logic, $G_2$ denotes an AND gate for taking the logic product of the output of the inverter $IV_3$ and the ON-OFF signal of the camera use detecting switch $SW_v$, $IV_4$ denotes an inverter for obtaining the ON-OFF signal of the camera use detecting switch $SW_v$ at an inverted logic, $IV_5$ designates an inverter for obtaining the ON-OFF signal of the camera side trigger switch $SW_T$ at an inverted logic when the video camera is connected to the recorder 10, $G_3$ denotes an AND gate for taking the logic product of the outputs of the inverters $IV_4$ and $IV_5$, $G_4$ denotes an OR gate for taking the logic sum of the outputs of the AND gates $G_2$ and $G_3$ and the output of the inverter $IV_2$, $G_5$ designates an AND gate for taking the logic product of the output of the OR gate $G_4$ and the ON-OFF signal of the detecting contact piece 28d, and $G_6$ denotes an OR gate for taking the logic sum of the outputs of the AND gates $G_1$ and $G_5$. The output of the OR gate $G_6$ is imparted to the base of an npn switching transistor $Q_1$ for rotating the loading motor LM in forward direction. $IV_6$ designates an inverter for obtaining the ON-OFF signal of the detecting contact piece 28d at an inverted logic. The output of the inverter $IV_6$ is imparted to the base of an npn switching transistor $Q_7$ for controlling the pinch roller urging solenoid PS. $IV_7$ denotes an inverter for obtaining the ON-OFF signal of the detecting contact piece 28c at an inverted logic, $G_7$ designates an AND gate for taking the logic product of the output of the inverter $IV_7$ and the output of the OR gate $G_4$, and $IV_8$ denotes an inverter for obtaining the output of the AND gate $G_7$ at an inverted logic. The output of the inverter $IV_8$ is imparted to the bases of a power supply controlling pnp switching transistor $Q_{11}$ for a cylinder motor controlling circuit $MCC_1$ for controlling the cylinder motor CM, a power supply controlling pnp switching transistor $Q_{12}$ for a capstan motor control circuit $MCC_2$ for controlling the capstan motor CPM, and a power supply controlling pnp switching transistor $Q_{13}$ for an image recording and reproducing circuit VDC. $IV_9$ designates an inverter for obtaining the ON-OFF signal of the detecting contact piece 28a at an inverted logic, and $IV_{10}$ denotes an inverter for obtaining the ON-OFF signal of the stop switch $SW_s$ at an inverted logic. The output of the inverter $IV_{10}$ is imparted to the base of an npn switching transistor $Q_{10}$ for controlling a stop solenoid SS. $G_8$ designates an AND gate for taking the logic product of the outputs of the inverters $IV_9$ and $IV_{10}$, $G_{14}$ denotes an AND gate for taking the logic product of the ON-OFF signals of the camera side trigger switch $SW_T$, the recorder side image recording mode switch $SW_R$ and the reproducing mode switch $SW_p$, $G_{10}$ denotes an AND gate for taking the logic product of the output of the AND gate $G_{14}$ and the output of the inverter $IV_7$, and $G_{11}$ designates an OR gate for taking the logic sum of the outputs of the AND gates $G_8$ and $G_{10}$. The output of the OR gate $G_{11}$ is imparted to the base of an npn switching transistor $Q_2$ for rotating the loading motor LM in reverse direction. $IV_{11}$ denotes an inverter for obtaining the ON-OFF signal of the tape fast rewind mode switch $SW_{FR}$ at an inverted logic, $IV_{12}$ designates an inverter for obtaining the ON-OFF signal of the tape fast forwarding mode switch $SW_{FF}$ at an inverted logic, $G_9$ designates an OR gate for taking the logic sum of the outputs of the inverters $IV_{11}$ and $IV_{12}$, $G_{12}$ denotes an OR gate for taking the logic sum of the output of the OR gate $G_9$ and the output of the AND gate $G_7$, and $IV_{13}$ designates an inverter for obtaining the output of the OR gate $G_{12}$ at an inverted logic. The output of the inverter $IV_{13}$ is imparted to the base of a controlling pnp switching transistor $Q_{14}$ for a sound recording and reproducing circuit ADC. $G_{13}$ designates an OR gate for taking the logic sum of the outputs of the inverters $IV_6$ and $IV_{12}$. The output of the OR gate $G_{13}$ is imparted to the base of a controlling npn switching transistor $Q_9$ for a clutch solenoid TCS for connecting the tape take-up drive means 45 (shown in FIG. 1) to a tape core driving motor TCM. $G_{16}$ denotes an AND gate for taking the logic product of the output of the AND gate $G_8$ and the ON-OFF signal of the detecting contact piece 28b, $G_{17}$ designates an AND gate for taking the logic product of the output of the AND gate $G_{10}$ and the ON-OFF signal of the detecting contact piece 28d, and $G_{20}$ denotes an OR gate for taking the logic sum of the outputs of the AND gates $G_{16}$ and $G_{17}$ and the output of the OR gate $G_{12}$. The output of the OR gate $G_{20}$ is imparted to the base of an npn switching transistor $Q_{15}$ for controlling the tape core driving motor TCM. $IV_{15}$ denotes an inverter for obtaining the output of the OR gate $G_{13}$ at an inverted logic, $G_{18}$ designates an OR gate for taking the logic sum of the output of the inverter $IV_{11}$ and the outputs of the AND gates $G_{16}$ and $G_{17}$, and $G_{19}$ denotes an AND gate for taking the logic product of the output of the OR gate $G_{18}$, and the output of the inverter $IV_{15}$. The output of the AND gate $G_{19}$ is imparted to the base of a controlling npn switching transistor $Q_8$ for a clutch solenoid RCS for connecting the tape rewind drive means 46 (shown in FIG. 1) to the tape core driving motor TCM. $G_{15}$ denotes an AND gate for taking the logic product of the output of the inverter $IV_{10}$ and the ON-OFF signal of the detecting contact piece 28a. The output of the AND gate $G_{15}$ is imparted to the base of an npn switching transistor $Q_{16}$ for controlling a cassette ejecting solenoid ES forming a cassette eject mechanism.

$Q_3$, $Q_4$ and $Q_5$, $Q_6$ are pnp switching transistors and npn switching transistors forming the circuit for rotating the loading motor LM in forward direction and reverse direction. The bases of the transistors $Q_3$ and $Q_5$ are connected to the collector and emitter, respectively, of the transistor $Q_1$, and the bases of the transistors $Q_4$ and $Q_6$ are connected to the collector and emitter, respectively, of the transistor $Q_2$.

Description will now be made of the operation of the video tape recorder 10 having the above-described construction.

In the condition before the tape cassette 1 is loaded, the loading arms 16A, 16B and the mechanism system connected thereto are in their positions as shown in FIG. 2(A) and accordingly, the inclined pin 14A, the guide post 15A, the inclined pin 14B and the guide post 15B are in the unloading position as shown in FIG. 2(A). Also, at this time, the printed disc 26 in the position detecting means 25 is in the state shown in FIG. 4(A) with respect to the brush 28 and thus, the detecting contact pieces 28a-28d are all in their OFF position. In this state, when the main switch, not shown, of the recorder 10 is closed and then the tape cassette 1 is loaded into the cassette loading portion of the recorder 10 as shown in FIG. 2(A), the cassette loading detecting switch $SW_c$ is closed, so that the output of the inverter $IV_1$ becomes high and in this state, both of the outputs of the inverters $IV_9$ and $IV_{10}$ are low and therefore, the output of the inverter $IV_{14}$ becomes low and further, as described above, the detecting contact piece 28b of the brush 28 is in its OFF position and so, all of the three inputs of the AND gate $G_1$ become high, whereby the output thereof becomes high. Accordingly, the output of the OR gate $G_6$ becomes high and so, the transistor $Q_1$ for rotating the loading motor in forward direction is turned so that the transistors $Q_3$ and $Q_5$ are turned on, thus the loading motor LM starts to rotate in forward direction and the loading arms 16A and 16B are pivoted clockwise and counter-clockwise, respectively, from their positions shown in FIG. 2(A). Accordingly, the inclined pin 14A, the guide post 15A, the inclined pin 14B and the guide post 15B which have come in to be positioned at the back side of the tape stretched between the guide rollers 5 and 6 in the cassette 1 though the cut-away portions 1a, 1b as shown in FIG. 2(A) during the loading of the tape cassette 1 are moved clockwise and counter-clockwise, respectively, so that the tape 4 is drawn out from the cassette 1. In case of the draw-out of the tape 4 from the cassette 1, when the inclined pin 14A, the guide post 15A, the inclined pin 14B and the guide post 15B reach the pre-loading position shown in FIG. 2(B), the detecting contact piece 28b of the brush 28 comes into contact with the conductor pattern 27 with the then clockwise rotation of the printed disc 26 and is thereby closed (see FIG. 4(B)). Accordingly, the output of the AND gate $G_1$ becomes low, so that the output of the OR gate $G_6$ becomes low, the transistor $Q_1$ is turned off, and the transistors $Q_3$ and $Q_5$ are turned off. The loading motor LM is stopped and thus, the inclined pin 14A, the guide post 15A, the inclined pin 14B and the guide post 15B are stopped at this pre-loading position and, as shown in the same Figure, there is brought about the pre-loading condition in which the tape 4 is brought into contact with a control signal and audio signal recording and reproducing head 29 but is in non-contact with the cylinders 12A and 12B.

In this condition, as will be understood from FIG. 4(B), the detecting contact piece 28c is still in its OFF position. Accordingly, the output of the inverter $IV_7$ is low and therefore, the output of the AND gate $G_{10}$ is low in spite of the output of the AND gate $G_{14}$ being high.

Now, each operation mode in such condition will be described.

(A) A mode in which image recording is effected by the use of the video camera

When the plug 49 of the camera cable 48 is inserted into the recorder side jack 47, the camera use detecting switch $SW_v$ is closed. Accordingly, one input of the AND gate $G_2$ is set to low (this means the nullification of the operation of the image recording mode switch $SW_R$ on the recorder 10 side) while, on the other hand, one input of the AND gate $G_3$ is set to high by the output of the inverter $IV_4$. When the camera side trigger switch $SW_T$ is closed to effect photography in this condition, the camera starts to effect the photographing operation and at the same time, on the recorder 10 side, the output of the inverter $IV_5$ becomes high, so that the output of the AND gate $G_3$ becomes high. Accordingly, the output of the OR gate $G_4$ becomes high. On the other hand, in this condition, the detecting contact piece 28d is in its OFF position (see FIG. 4(B)). Accordingly, the two inputs of the AND gate $G_5$ become high and therefore, the output thereof becomes high. Therefore, the output of the OR gate $G_6$ again becomes high, so that the transistor $Q_1$ is again turned on and the loading motor LM is again rotated in forward direction. Thus, the inclined pin 14A, the guide post 15A, the inclined pin 14B and the guide post 15B are further moved from the pre-loading position shown in FIG. 2(B) toward the loading position. On the other hand, when the movement of the inclined pins 14A, 14B and the guide posts 15A, 15B from the pre-loading position toward the loading position is started, the detecting contact piece 28c comes into contact with the conductor pattern 27 and is thereby closed (see FIG. 4(B)) immediately after the start of said movement so that the output of the inverter $IV_7$ becomes high. Accordingly, the output of the AND gate $G_7$ becomes high, thereby, the outputs of the inverters $IV_3$ and $IV_{13}$ become low and the transistors $Q_{11}$-$Q_{14}$ are turned on. Accordingly, the cylinder motor CM and the capstan motor CPM are started, so that the upper cylinder 12B, the image recording and reproducing magnetic heads 13A, 13B and the capstan 30 are rotated. At the same time, the image recording and reproducing circuit VDC and the sound recording and reproducing circuit ADC are operated (of course, in this case, the image recording and reproducing circuit VDC and the sound recording and reproducing circuit ADC are both set to the recording mode by unshown means). Also, at this time, the output of the OR gate $G_{20}$ becomes high by the output of the OR gate $G_{12}$, so that the transistor $Q_{15}$ is turned on and the tape core driving motor TCM is also started (but, in this condition, both clutch solenoids TCS and RCS are in OFF state and accordingly, the clutch connections of the tape take-up drive means 45 and the tape rewind drive means 46 to the tape core driving motor TCM are broken). When, by the forward rotation of the loading motor LM, the inclined pin 14A, the guide post 15A, the inclined pin 14B and the guide post 15B reach the loading position shown in FIGS. 1 and 2(C), the detecting contact piece 28d comes into contact with the conductor pattern 27 on the printed disc 26 and is thereby closed (see FIG. 4(B)). Accordingly, at this point of time, the output of the AND gate $G_5$ becomes low, so that the output of the OR gate $G_6$ becomes low and the transistor $Q_1$ is turned off. Thus, the loading motor LM is stopped and therefore, the inclined pin 14A, the guide post 15A, the inclined pin 14B and the guide post 15B are stopped at the loading position shown in the same Figure (as previously described, the loading arms 16A, 16B become latched at this loading position by unshown latch means). On the other hand, when the detecting contact piece 28d is closed, the output of the inverter $IV_6$ becomes high. Accordingly, the transistor $Q_7$ is turned on and the pinch roller urging solenoid PS is operated so that the armature rod 38 thereof is attracted and, by the then urging force of the coil spring 39, the pinch roller 34 becomes urged against the capstan 30 with the tape 4 interposed therebetween, as shown in the same Figure. Also, when the output of the inverter $IV_6$ becomes high, the output of the OR gate $G_{13}$ becomes high, so that the transistor $Q_9$ is turned on and the clutch solenoid TCS is operated so that the tape take-up drive means 45 becomes connected to the tape core driving motor TCM and the tape take-up side core 3 of the cassette is rotated clockwise as viewed in the Figure. Thus, the movement of the tape 4 in the direction of arrow is started and at this time, by the output from the video camera, video signals are recorded on the tape 4 through the image recording and reproducing circuit VDC and rotatable magnetic heads 13A, 13B which are in the image recording mode. Further, audio signals are recorded on the tape 4 through the sound recording and reproducing circuit ADC and magnetic head 29 both of which are in the sound recording mode.

Of course, this recording operation continues as long as the video camera side trigger switch $SW_T$ is closed.

On the other hand, when the camera side trigger switch $SW_T$ is opened to stop photography, the photographing operation of the camera is stopped and at the same time, on the recorder 10 side, the output of the inverter $IV_5$ becomes low, so that the output of the AND gate $G_3$ becomes low. Accordingly, the output of the AND gate $G_7$ becomes low, so that the output of the OR gate $G_{12}$ becomes low. The output of the OR gate $G_{20}$ becomes low, and therefore, the transistor $Q_{15}$ is turned off and the tape core driving motor TCM is stopped. On the other hand, the outputs of the inverters $IV_8$ and $IV_{13}$ become high and the transistors $Q_{11}$-$Q_{14}$ are turned off so that the cylinder motor CM and the capstan motor CPM are stopped and the operations of the image recording and reproducing circuit VDC and the sound recording and reproducing circuit ADC are stopped. Also, when the trigger switch $SW_T$ is opened, all the three inputs of the AND gate $G_{14}$ become high (that is, in this case, the image recording mode switch $SW_R$ and the reproducing mode switch $SW_p$ are both open). Therefore, the output thereof becomes high. In this condition, the detecting contact piece 28c is in contact with the conductor pattern 27 and is closed (see FIG. 4(B)) so that the output of the inverter $IV_7$ is high. Accordingly, the output of the AND gate $G_{10}$ becomes high, so that the output of the OR gate $G_{11}$ becomes high. By this, the transistor $Q_2$ for rotating the loading motor in reverse direction is turned on and therefore, the transistors $Q_4$ and $Q_6$ are turned on and the loading motor LM starts reverse rotation. Accordingly, the loading arms 16A and 16B are pivoted counter-clockwise and clockwise, respectively, whereby the inclined pin 14A, the guide post 15A, the inclined pin 14B and the guide post 15B are moved counter-clockwise and clockwise, respectively, from the loading position shown in FIGS. 1 and 2(C) toward the pre-loading position shown in FIG. 2(B). On the other hand, when the loading motor LM is rotated in reverse direction, the printed disc 26 is rotated counter-clockwise and therefore, the detecting brush 28d is brought out of contact with the conductor pattern 27 with the then counter-clockwise rotation of the printed disc 26 immediately after the start of the movement of the inclined pins 14A, 14B and the guide posts 15A, 15B from the loading position toward the pre-loading position so that the detecting brush 28d becomes open (see FIG. 4(B)). Accordingly, at this point of time, the output of the inverter $IV_6$ becomes low so that the transistor $Q_7$ is turned off and the pinch roller urging solenoid PS becomes inoperative. The pinch roller 34 becomes spaced apart from the capstan 30 by the armature rod 38 while, at the same time, the output of the OR gate $G_{13}$ becomes low by the output of the inverter $IV_6$ so that the transistor $Q_9$ is turned off and the clutch solenoid TCS becomes inoperative. Further, the clutch connection of the tape take-up drive means 45 to the tape core driving motor TCM becomes broken. Also, when the detecting contact piece 28d becomes open, the output of the AND gate $G_{10}$ becomes high, so that the output of the AND gate $G_{17}$ becomes high. Accordingly, the output of the OR gate $G_{20}$ becomes high and the transistor $Q_{15}$ is turned on so that the tape core driving motor TCM is again operated and at the same time, the output of the inverter $IV_{15}$ becomes high by the output of the OR gate $G_{13}$, so that the output of the AND gate $G_{18}$ becomes high. Accordingly, the output of the AND gate $G_{19}$ becomes high and the transistor $Q_8$ is turned on so that the clutch solenoid RCS is operated and the tape rewind drive means 46 is connected to the tape core driving motor TCM. Thus, during the shift from the tape loading condition shown in FIGS. 1 and 2(C) to the tape pre-loading condition shown in FIG. 2(B), the tape supply side core 2 of the cassette 1 is driven counter-clockwise eliminating the slack of the tape 4. When the detecting contact piece 28d is opened, one input of the AND gate $G_5$ becomes high while, on the other hand, the output of the inverter $IV_5$ becomes low by opening of the camera side trigger switch $SW_T$. Therefore, the output of the AND gate $G_3$ becomes low and accordingly, the output of the OR gate $G_4$ becomes low, so that the output of the AND gate $G_5$ remains low. Thus, the output of the OR gate $G_6$ also remains low. When, by the reverse rotation of the loading motor LM, the inclined pin 14A, the guide post 15A, the inclined pin 14B and the guide post 15B have come from the loading position shown in FIGS. 1 and 2(C) to the pre-loading position shown in FIG. 2(B), the detecting contact piece 28c is brought out of contact with the conductor pattern 27 and is thereby opened (see FIG. 4(B)). The output of the inverter $IV_7$ becomes low and the output of the AND gate $G_{10}$ becomes low, so that the output of the OR gate $G_{11}$ becomes low and the transistor $Q_2$ is turned off. Accordingly, the transistors $Q_4$ and $Q_6$ are turned off, so that at this point of time, the loading motor LM is stopped. Also, when the output of the AND gate $G_{10}$ becomes low, the output of the AND gate $G_{17}$ becomes low and therefore, the outputs of the AND gate $G_{19}$ and the OR gate $G_{20}$ become low. Accordingly, the transistors $Q_8$ and $Q_{15}$ are turned off and the clutch connection of the tape rewind drive means 46 to the tape core driving motor TCM is broken and at the same time, the tape core driving motor TCM is stopped. In this condition, as will be understood from FIG. 4(B), the detecting contact piece 28b is still in contact with the conductor pattern 27 and remains closed and therefore, the output of the AND gate $G_1$ is low. Accordingly, the output of the OR gate $G_6$ is low.

Thus, when the trigger switch $SW_T$ is opened on the camera side, the tape 4 is set to the pre-loading condition shown in FIG. 2(B) and in this condition, the operation of the recorder 10 becomes stopped.

(B) A mode in which image recording is effected without using the video camera (on-air image recording mode)

Where image recording is effected without using the video camera but with the recorder connected to a television receiver, the plug 49 of the camera cable 48 is removed from the jack 47. Therefore the camera use detecting switch $SW_v$ is opened, so that one input of the AND gate $G_3$ is made low by the output of the inverter $IV_4$, while one input of the AND gate $G_2$ is high. Accordingly, in this condition, when the image recording mode switch $SW_R$ is closed by depression of the image recording mode button 40, the output of the inverter $IV_3$ becomes high. Therefore, both the two inputs of the AND gate $G_2$ become high so that the output thereof becomes high and the output of the OR gate $G_4$ becomes high, so that in the same manner as that described previously, the tape loading is started from the tape pre-loading condition shown in FIG. 2(B). At the same time, as already described, the cylinder motor CM, the capstan motor CPM, the tape core driving motor TCM, the image recording and reproducing circuit VDC and the sound recording and reproducing circuit ADC (of course, in this case, the image recording and reproducing circuit VDC and the sound recording and reproducing circuit ADC are both set to the recording mode by unshown means) are operated. When the loading of the tape 4 is completed, the pinch roller 34 is urged against the capstan 30 as previously described, and at the same time, the tape take-up drive means 45 is connected to the tape core driving motor TCM. Thus, movement of the tape 4 is started and in this case, image recording comes to be effected by the output from the television receiver.

As already described, the image recording mode button 40 is latched at its depressed position by well-known means, not shown. Accordingly, the above-described image recording operation is continued until the stop button 44 is operated. That is, when the stop button 44 is depressed, the stop switch $SW_s$ is closed thereby, and therefore, the output of the inverter $IV_{10}$ becomes high. Accordingly, the transistor $Q_{10}$ is turned on, so that the stop solenoid SS is operated and the latching of the image recording mode button 40 is released. The image recording mode button 40 is returned to its non-depressed position by the force of a return spring, not shown while, at the same time, the image recording mode switch $SW_R$ is opened. The output of the AND gate $G_2$ becomes low, so that the output of the OR gate $G_4$ becomes low and the cylinder motor CM, the capstan motor CPM, the tape core driving motor TCM, the image recording and reproducing circuit VDC and the sound recording and reproducing circuit ADC are all stopped from operating and thus, the image recording operation is stopped. On the other hand, when the image recording mode switch $SW_R$ is opened, all the three inputs of the AND gate $G_{14}$ become high so that the output thereof becomes high. Accordingly, in the same manner as that described previously, the loading motor LM is rotated in reverse direction so that the shift from the tape loading condition shown in FIGS. 1 and 2(C) to the tape pre-loading condition shown in FIG. 2(B) is initiated. At the same time, the detecting contact piece 28d is brought out of contact with the conductor pattern 27 and as previously described is thereby opened so that the pressure contact of the pinch roller 34 is released. On the other hand, the clutch connection of the tape take-up drive means 45 to the tape core driving motor TCM is broken and at the same time, the tape core driving motor TCM is again operated and also the clutch solenoid RCS is operated so that the tape rewind drive means 46 is connected to the tape core driving motor TCM. The tape supply side core 2 is counter-clockwise driven so that the slack of the tape 4 during the shift from the tape loading condition to the tape pre-loading condition is eliminated. If the shift to the tape pre-loading condition shown in FIG. 2(B) has been accomplished, the stop switch $SW_s$ is opened by the releasing of the depression of the stop button 44, the output of the AND gate $G_8$ becomes low and the output of the AND gate $G_{10}$ becomes low by the opening of the detecting contact piece 28c so that the loading motor LM is stopped. At the same time, the output of the AND gate $G_{17}$ becomes low so that the tape core driving motor TCM is stopped and the clutch connection of the tape rewind drive means 46 to the tape core driving motor TCM is broken. Accordingly, the recorder 10 is stopped in the tape pre-loading condition. (The operation in the tape pre-loading condition in a case where the stop switch $SW_s$ is in its ON position will be explained under the item of "(E) Removal of the Tape Cassette" which will later be described.)

(C) Reproducing mode

When the reproducing mode button 41 is depressed to effect the reproduction of the recorded signals on the tape 4, the reproducing mode switch $SW_p$ is closed and therefore, the output of the inverter $IV_2$ becomes high. Accordingly, the output of the OR gate $G_4$ becomes high, so that, in the same manner as that previously described, the loading of the tape 4 is started from the tape pre-loading condition shown in FIG. 2(B). At the same time, the cylinder motor CM, the capstan motor CPM, the tape core driving motor TCM, the image recording and reproducing circuit VDC and the sound recording and reproducing circuit ADC (of course, in this case, the image recording and reproducing circuit VDC and the sound recording and reproducing circuit ADC are set to the reproducing mode by unshown means) are operated as previously described. When the loading of the tape 4 is completed, the pinch roller 34 is urged against the capstan 30 as already described while the tape take-up drive means 45 is connected to the tape core driving motor TCM. Thus, movement of the tape 4 is started so that reproduction of the recorded signals on the tape 4 is effected.

As will be understood from the construction of the logic circuit of FIG. 5, the setting of this reproducing mode can be effected by the closing of the reproducing mode switch $SW_p$ irrespective of the closing or opening of the camera use detecting switch $SW_v$. Accordingly, reproduction can be effected even with the video camera remaining connected to the recorder 10, and particularly where a video camera equipped with an electric view finder is used as the video camera. This is intended to enable the monitoring of reproduced images to be effected by utilizing the electronic view finder of the camera.

Again in this case, as previously described, the reproducing mode button 41 is latched at its depressed position by well-known means, not shown. The above-described reproducing operation is continued until the stop button 44 is operated. That is, when the stop button 44 is depressed and the stop switch $SW_s$ is closed, the stop solenoid SS is operated in the same manner as that previously described and therefore, the latching of the reproducing mode button 41 is released and the reproducing mode switch $SW_p$ is opened. Accordingly, the output of the OR gate $G_4$ becomes low by the then output of the inverter $IV_2$ so that as previously described, the cylinder motor CM, the capstan motor CPM, the tape core driving motor TCM, the image recording and reproducing circuit VDC and the sound recording and reproducing circuit ADC are stopped from operating. At the same time, the output of the AND gate $G_{14}$ becomes high and therefore, as previously described, the shift from the tape loading condition to the tape pre-loading condition is started. Also, the detecting contact piece 28d is opened as previously described so that the pressure contact of the pinch roller 34 is released and also the clutch connection of the tape take-up drive means 45 to the tape core driving motor TCM is broken. At the same time, the tape core driving motor TCM is again operated and the tape rewind drive means 46 is connected to the tape core driving motor TCM by the operation of the clutch solenoid RCS so that the then slack of the tape 4 is eliminated. If the shift to the tape pre-loading condition shown in FIG. 2(B) has been effected, the stop switch $SW_s$ is opened as previously described, the loading motor LM and the tape core driving motor TCM are stopped by the opening of the detecting contact piece 28c. At the same time, the clutch connection of the tape rewind drive means 46 to the tape core driving motor TCM is broken, whereupon the recorder 10 is stopped in the tape pre-loading condition shown in FIG. 2(B). (Likewise, the operation in the tape pre-loading condition and in a case where the stop switch SWs is in its ON position will be explained under the item of "(E) Removal of the Tape Cassette" which will later be described.)

(D) Tape fast forward or tape fast rewind mode

When, in the tape pre-loading condition shown in FIG. 2(B), the tape fast forward mode button 42 or the tape fast rewind mode button 43 is depressed, the tape fast forward mode switch $SW_{FF}$ or the tape fast rewind mode switch $SW_{FR}$ is closed, so that the output of the inverter $IV_{12}$ or the inverter $IV_{11}$ becomes high. Accordingly, the output of the OR gate $G_9$ becomes high and therefore, the outputs of the OR gates $G_{12}$ and $G_{20}$ become high. The tape core driving motor TCM is operated by the output of the OR gate $G_{20}$. On the other hand, the sound recording and reproducing circuit ADC (in this case, the sound recording and reproducing circuit ADC is set to the reproducing mode by unshown means) is operated by the output of the inverter $IV_{13}$. When the output of the inverter $IV_{12}$ has become high by the closing of the tape fast forward mode switch $SW_{FF}$, the output of the OR gate $G_{13}$ becomes high, so that the clutch solenoid TCS is operated by turn-on of the transistor $Q_9$ and the tape take-up drive means 45 becomes connected to the tape core driving motor TCM. On the other hand, when the output of the inverter $IV_{11}$ becomes high by the closing of the tape fast rewind mode switch $SW_{FR}$, the output of the AND gate $G_{19}$ becomes high so that the transistor $Q_8$ is turned on and therefore, the clutch solenoid RCS is operated and the tape rewind drive means 46 becomes connected to the tape core driving motor TCM. Thus, when the tape fast forward mode button 42 is operated, the tape take-up side core 3 of the tape cassette 1 is rotated clockwise as viewed in FIG. 2(B) and the fast forward of the tape 4 comes to be effected. On the other hand, when the tape fast rewind mode button 43 is operated, the tape supply side core 2 of the tape cassette 1 is rotated counter-clockwise as viewed in FIG. 2(B) and the fast rewind of the tape 4 comes to be effected.

The operation in the case where the tape fast forward or the tape fast rewind has been started in the tape pre-loading condition shown in FIG. 2(B) has been described above. However, in the present embodiment, even in the course of the image recording operation or the reproducing operation described under items (B) and (C) above, the tape fast forward or the tape fast rewind can be effected directly, namely, without operating the stop button 44 to stop the image recording operation or the reproducing operation. That is, when the tape fast forward mode button 42 or the tape fast rewind mode button 43 is depressed in the course of the image recording operation or the reproducing operation, the latching of the image recording mode button 40 or the reproducing mode button 41 so far latched in its depressed position by well-known means is released. Accordingly, the image recording mode switch $SW_R$ or the reproducing mode switch $SW_P$ is opened, so that the cylinder motor CM, the capstan motor CPM and the image recording and reproducing circuit VDC are stopped from operating while the tape core driving motor TCM and the sound recording and reproducing circuit ADC are maintained in their operative conditions. At this time, the output of the AND gate $G_{14}$ becomes high, so that the shift from the tape loading condition to the tape pre-loading condition takes place as previously described. Thus, the image recording or reproducing operation is stopped by operation of the tape fast forward mode button 42 or the tape fast rewind mode button 43 and the shift from the tape loading condition to the tape pre-loading condition takes place. At this time, the tape fast forward or the tape fast rewind is immediately started. In this case, when the tape fast forward mode switch SWFF has been closed, the output of the inverter $IV_{12}$ becomes high and therefore, even if during the shift from the tape loading condition to the tape pre-loading condition, the output of the inverter $IV_6$ becomes low by the detecting contact piece 28d being opened, the operation of the clutch solenoid TCS is continued and the connection of the tape take-up drive means 45 to the tape core driving motor TCM is maintained. At this time, the output of the inverter $IV_{15}$ becomes low and the output of the AND gate G19 becomes low so that the clutch solenoid RCS is maintained inoperative and thus, in the case of the tape fast forward mode, the tape fast forward is started from the first so that the slack of the tape 4 caused during the shift from the tape loading condition to the tape pre-loading condition is automatically eliminated. On the other hand, when the tape fast rewind mode switch SWFR has been closed, the output of the inverter IV11 becomes high so that the output of the OR gate G13 becomes high. However, in this case, the output of the inverter $IV_6$ is high until the detecting contact piece 28d becomes open, so that the output of the OR gate G13 is high and the output of the inverter $IV_{15}$ becomes low and therefore, the output of the AND gate G19 is low. Accordingly, the clutch solenoid RCS is maintained inoperative until the detecting contact piece 28d is opened, while on the other hand the clutch solenoid TCS is maintained operative so that take-up of the tape 4 is temporally effected. When the detecting contact piece 28d is opened, the output of the inverter $IV_6$ becomes low so that the output of the OR gate G13 becomes low and the output of the inverter IV15 becomes high. Also, the output of the AND gate G19 becomes high and the clutch solenoid TCS is maintained inoperative while the clutch solenoid RCS is maintained operative and thus, at this point of time, the fast rewind of the tape 4 is started.

Incidentally, as will be understood from FIG. 2(B), in the present embodiment, the tape 4 is fast forwarded or fast rewound while being in contact with the control signal and audio signal recording and reproducing head 29. On the other hand, when this tape is fast forwarded or fast rewound as described above, the sound recording and reproducing circuit ADC is in its operative condition (in its reproducing mode) by the output of the OR gate G9. Accordingly, as is well-known, by recording search signals in advance by utilization of the audio track of the tape 4, the then reproducing output of the sound recording and reproducing circuit ADC may be utilized to effect the search of the recorded signals on the tape 4.

The tape fast forward or the tape fast rewind operation is also effected by operating the stop button 44. That is, by operating the stop button 44, the stop switch $SW_s$ is closed so that the stop solenoid SS is operated. Whereupon the latching of the tape fast forward mode button 42 and the tape fast rewind mode button 43 is released so that the tape fast forward mode switch SW$_{FF}$ and the tape fast rewind mode switch SW$_{FR}$ are opened. Accordingly, the outputs of the inverters $IV_{12}$ and $IV_{11}$ become low so that the tape fast forward operation and the tape fast rewind operation are stopped and the recorder 10 is stopped in the previously described tape pre-loading condition. (The operation where the stop button 44 is continually depressed will be explained under the next item "(E) Removal of the Tape Cassette".)

(E) Removal of the tape cassette

Removal of the tape cassette 1 from the recorder 10 becomes possible by the operation of the stop button 44. That is, in the previously described tape pre-loading condition, when the stop switch $SW_s$ is closed by depression of the stop button 44, the output of the inverter $IV_{10}$ becomes high and in this condition, the detecting contact piece 28a is in contact with the conductor pattern 27 and is in its ON position (see FIG. 4(B)). Accordingly, the output of the inverter $IV_9$ is high, so that the output of the AND gate G8 becomes high. By this, the transistor $Q_2$ for rotating the loading motor in reverse direction is turned on, so that the loading motor LM is rotated in reverse direction and the loading arms 16A and 16B are further pivoted counter-clockwise and clockwise, respectively, from their positions shown in FIG. 2(B) so that the inclined pin 14A, the guide post 15A, the inclined pin 14B and the guide post 15B are moved from the pre-loading position shown in FIG. 2(B) toward the unloading position shown in FIG. 2(A). On the other hand, immediately after the shift of the inclined pin 14A, the guide post 15A, the inclined pin 14B and the guide post 15B from the pre-loading position to the unloading position is started, the detecting contact piece 28b is brought in contact with the pattern 27 and is thereby opened (see FIG. 4(B)). Accordingly, the output of the AND gate $G_{16}$ becomes high so that the output of the OR gate $G_{20}$ becomes high. Thus, the tape core driving motor TCM is operated and in this condition, the output of the OR gate $G_{13}$ is low and the output of the inverter $IV_{15}$ is high, so that the output of the AND gate $G_{19}$ also becomes high. Accordingly, the clutch solenoid RCS is operated and the tape rewind drive means 46 becomes connected to the tape core driving motor TCM so that the tape supply side core 2 is driven to eliminate the slack of the tape 4 caused during the shift from the tape pre-loading condition to the tape loading condition. In this case, the two inputs of the AND gate $G_1$ become high by the detecting contact piece 28b being opened. On the other hand, in this condition, the output of the AND gate $G_3$ is high so that the output of the inverter $IV_{14}$ is low. Accordingly, even if the detecting contact piece 28b is opened, the output of the AND gate $G_1$ is maintained low. Now, when the inclined pin 14A, the guide post 15A, the inclined pin 14B and the guide post 15B reach the unloading position shown in FIG. 2(A) wherein the tape 4 is contained in the cassette 1, the detecting contact piece 28a is brought out of contact with the conductor pattern 27 and is thereby opened (see FIG. 4(B)). Thus, the output of the AND gate $G_{15}$ becomes high, so that the transistor $Q_{16}$ is turned on and the cassette ejecting solenoid ES is operated. Thus, the tape cassette 1 is ejected from the cassette loading portion of the recorder 10 through a cassette eject mechanism, not shown. On the other hand, when the detecting contact piece 28a is opened, the output of the inverter $IV_9$ becomes low, so that the output of the AND gate $G_3$ becomes low. Accordingly, the transistor $Q_2$ is turned off so that the loading motor LM is stopped. At this time, the output of the AND gate $G_{16}$ becomes low and both of the outputs of the OR gate $G_{20}$ and the AND gate $G_{19}$ become low so that the tape core driving motor TCM is stopped. On the other hand, the connection of the tape rewind drive means 46 to the tape core driving motor TCM is broken. When the output of the AND gate $G_8$ becomes low, the output of the inverter $IV_{14}$ becomes high. On the other hand, the cassette loading detecting switch $SW_c$ is opened by the ejection of the tape cassette 1. Accordingly, the output of the inverter $IV_1$ becomes low so that the output of the AND gate $G_1$ remains low. Incidentally, when the depression of the stop button 44 is released before the detecting contact piece 28a is opened, the output of the AND gate $G_8$ becomes low so that the output of the inverter $IV_{14}$ becomes high, so that the output of the AND gate $G_1$ becomes high. Accordingly, the transistor $Q_1$ is turned on so that the loading motor LM is rotated in forward direction and, by the same operation as that previously described, the tape pre-loading condition is restored, whereupon the loading motor is stopped.

Figure 6:
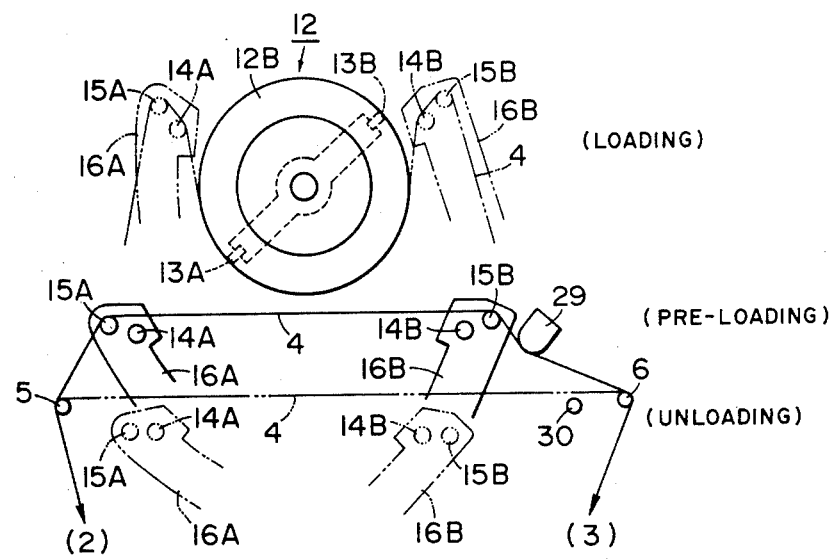
FIG. 6 is a plan view showing the essential portions of a modification of the tape loading means.

In the above-described construction of the embodiment, the tape fast forward or the tape fast rewind is effected in the tape pre-loading condition shown in FIG. 2(b). As described above, in this case, if the tape 4 is in a condition in which it is guided by the inclined pins 14A and 14B as shown in the same Figure, there is a fear that an undesirable influence such as partial dilation is imparted to the tape 4 due to the inclination of the pins 14A and 14B or that smooth movement of the tape 4 is hampered. In view of this point, as shown in FIG. 6, for example, the inclined pins 14A and 14B may preferably be disposed slightly short of the guide posts 15A and 15B so that in the tape pre-loading condition, the tape 4 is guided only by the upright guide posts 15A and 15B.

According to the present invention, as has been described above, the so-called tape pre-loading is made possible without the necessity of providing any special, independent, separate tape operating means for the conventional tape loading means. Accordingly, without the disadvantages such as a complicated construction of the mechanism portion or bulky size of the apparatus and by these, the various inconveniences peculiar to the prior art as previously mentioned all are eliminated, while many advantages may be obtained by utilizing the present invention in the conventional cassette type video tape recorders.

What we claim is:

1. An information signal recording and/or reproducing apparatus comprising:
    (a) means for receiving a container which houses therein a wound tape;
    (b) recording and/or reproducing means including a guide drum having at least one rotary head for recording an information signal onto the tape and reproducing an information signal recorded on the tape;
    (c) tape loading means for drawing the tape from the container so as to load the tape on the guide drum, said tape loading means including a movable member;
    (d) first tape guide means provided on said movable member for two-dimensionally guiding the tape running direction;
    (e) second tape guide means provided on said movable member for three-dimensionally guiding the tape running direction;
    (f) detection means for detecting a plurality of positions of said tape loading means to produce an output signal, said plurality of positions including a first position in which said first and second tape guide means are both out of contact with the tape, a second position in which said first and second tape guide means are both in contact with the tape, and a third position in which said first guide means is in contact with the tape while said second guide means is out of contact with the tape;
    (g) motor means for driving said loading means between said first position and said second position; and
    (h) control means for controlling said motor means in response to the output signal of said detection means, said control means being operable for selectively stopping said tape loading means at said first position, said second position and said third position.

2. An apparatus according to claim 1, further comprising means for recording a control signal onto the tape, said control signal recording means being arranged so as to record the control signal at least when said first and second tape guide means are in said third position.

3. An apparatus according to claim 1, further comprising means for recording a sub-information signal onto the tape, said sub-information signal recording means being arranged so as to record the sub-information signal at least when said first and second tape guide means are in said third position.

4. An apparatus according to claim 1, wherein recording or reproducing of information signal is performed by said recording and/or reproducing means when said tape loading means is in said second position.

5. An apparatus according to claim 1, wherein the guide drum is out of contact with the tape when said tape loading means is in said third position.

6. An apparatus according to claim 1, further comprising means for finding the state that the container is received by said receiving means, said control means changing the position of said tape loading means from said first position to said third position in response to an output of said finding means.

7. An apparatus according to claim 6, further comprising a recording switch for instructing recording of the information signal onto the tape, said control means changing, responsive to the turning on of said recording switch, the position of said tape loading means from said third position to said second position when said tape loading means is in said third position.

8. An apparatus according to claim 6, wherein the information signal includes a video signal.

9. An apparatus according to claim 8, further comprising means for connecting said apparatus with a video camera, so that said control means, in response to a trigger signal supplied by the video camera to said apparatus through said connection means, sets said tape loading means in said second position when said tape loading means is in a position other than said second position.

10. An information signal recording and/or reproducing apparatus comprising:
  (a) means for receiving a container which houses therein a wound tape;
  (b) recording and/or reproducing means including a guide drum having at least one rotary head for recording an information signal onto the tape and reproducing information signal recorded on the tape;
  (c) tape loading means for drawing the tape from the container so as to load the tape on the guide drum, said tape loading means including a movable member which has a first guide pin vertically provided so as to be perpendicularly in contact with the tape and a second guide pin inclined relative to said first guide pin;
  (d) detection means for detecting a plurality of positions of said tape loading means to produce an output signal, said plurality of positions including a first position in which said first and second guide pins are both out of contact with the tape housed in the container, a second position in which said first and second guide pins are both in contact with the tape drawn from the container, and a third position in which said first guide pin is in contact with the tape while said second guide pin is out of contact with the tape drawn from the container by said first guide pin;
  (e) motor means for driving said loading means between said first position and said second position; and
  (f) control means for controlling said motor means in response to the output signal of said detection means, said control means being operable for selectively stopping said tape loading means at said first position, said second position and said third position.

11. An information signal recording and/or reproducing apparatus comprising:
  (a) means for receiving a container which houses therein a wound tape;
  (b) recording and/or reproducing means including a guide drum having at least one rotary head for recording an information signal onto the tape and/or reproducing an information signal recorded on the tape;
  (c) tape loading means for drawing the tape from the container so as to load the tape on the guide drum;
  (d) detection means for detecting a plurality of positions of said tape loading means to produce an output signal, the plurality of positions including a first position at which said tape loading means is out of contact with the tape, a second position at which recording of reproducing of the information signal is performed by said recording and/or reproducing means, and a third position being located between the first and second positions;
  (e) motor means for driving said tape loading means; and
  (f) control means for controlling said motor means in response to the output signal of said detection means, said control means being operable for selectively stopping said tape loading means at said first position, said second position and said third position.

12. An apparatus according to claim 11, wherein said tape loading means includes a pair of tape loading members moved parallel with each other by said motor means.

13. An apparatus according to claim 12, wherein said detection means detects a plurality of positions of one movable member being related to said pair of tape loading members.

14. An apparatus according to claim 13, wherein said one movable member includes a rotary disc rotatable in cooperation with said pair of tape loading members, the diameter of the rotary disc being smaller than the diameter of the guide drum.

15. An apparatus according to claim 14, wherein said detection means detects a phase of said rotary disc.

* * * * *

UNITED STATES PATENT AND TRADEMARK OFFICE
CERTIFICATE OF CORRECTION

PATENT NO. : 4,745,498

DATED : May 17, 1988

INVENTOR(S) : Maeda, et al.

It is certified that error appears in the above-identified patent and that said Letters Patent is hereby corrected as shown below:

IN THE REFERENCES [75] INVENTORS

"Masaya Maeda; Hiroyki Takimoto, both of Kanagawa, Japan" should read --Masaya Maeda; Hiroyuki Takimoto; Noritsugu Hirata, all of Kanagawa, Japan--.

SHEET 9

Figure 5A:
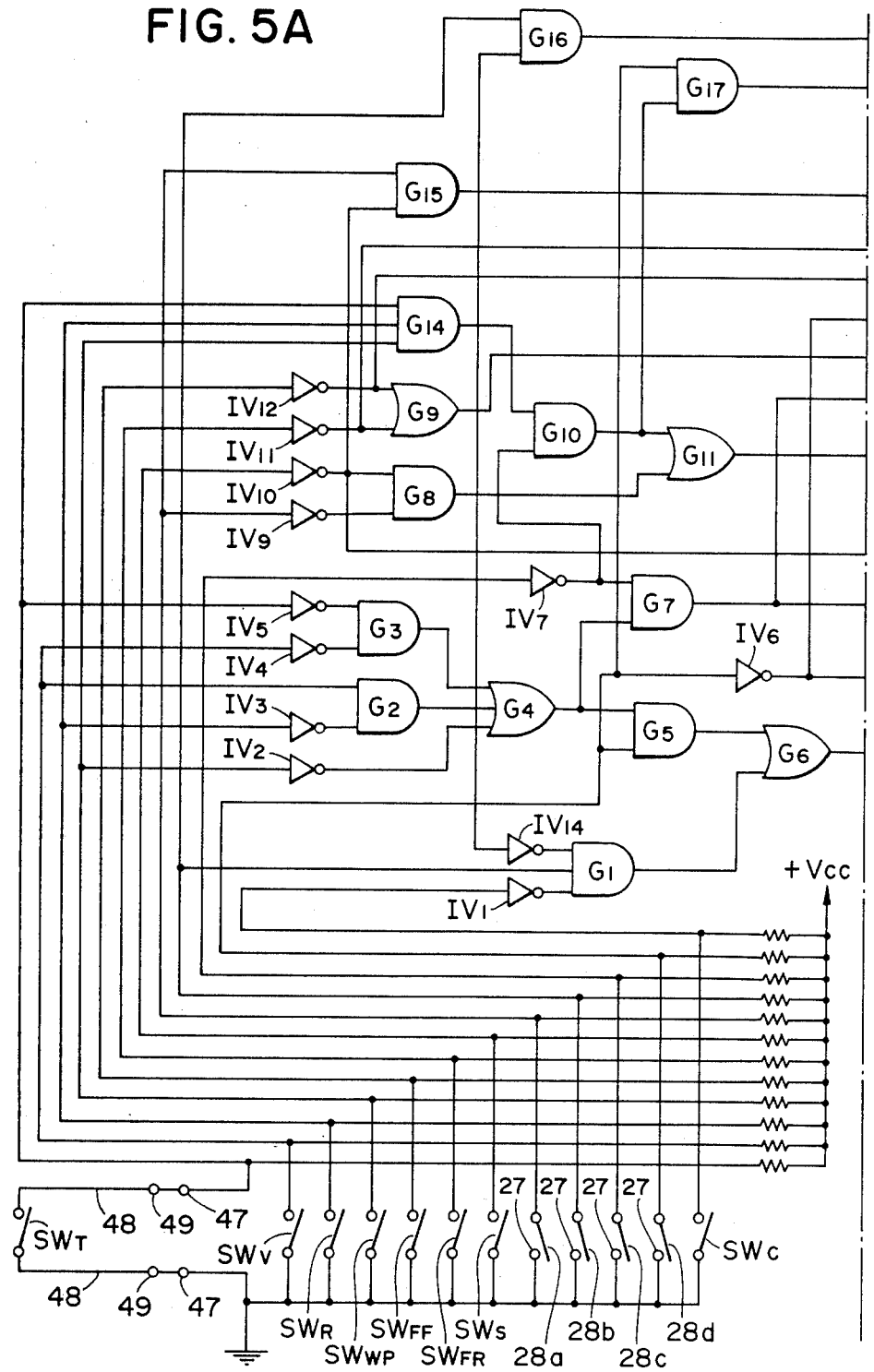
Figure 5B:
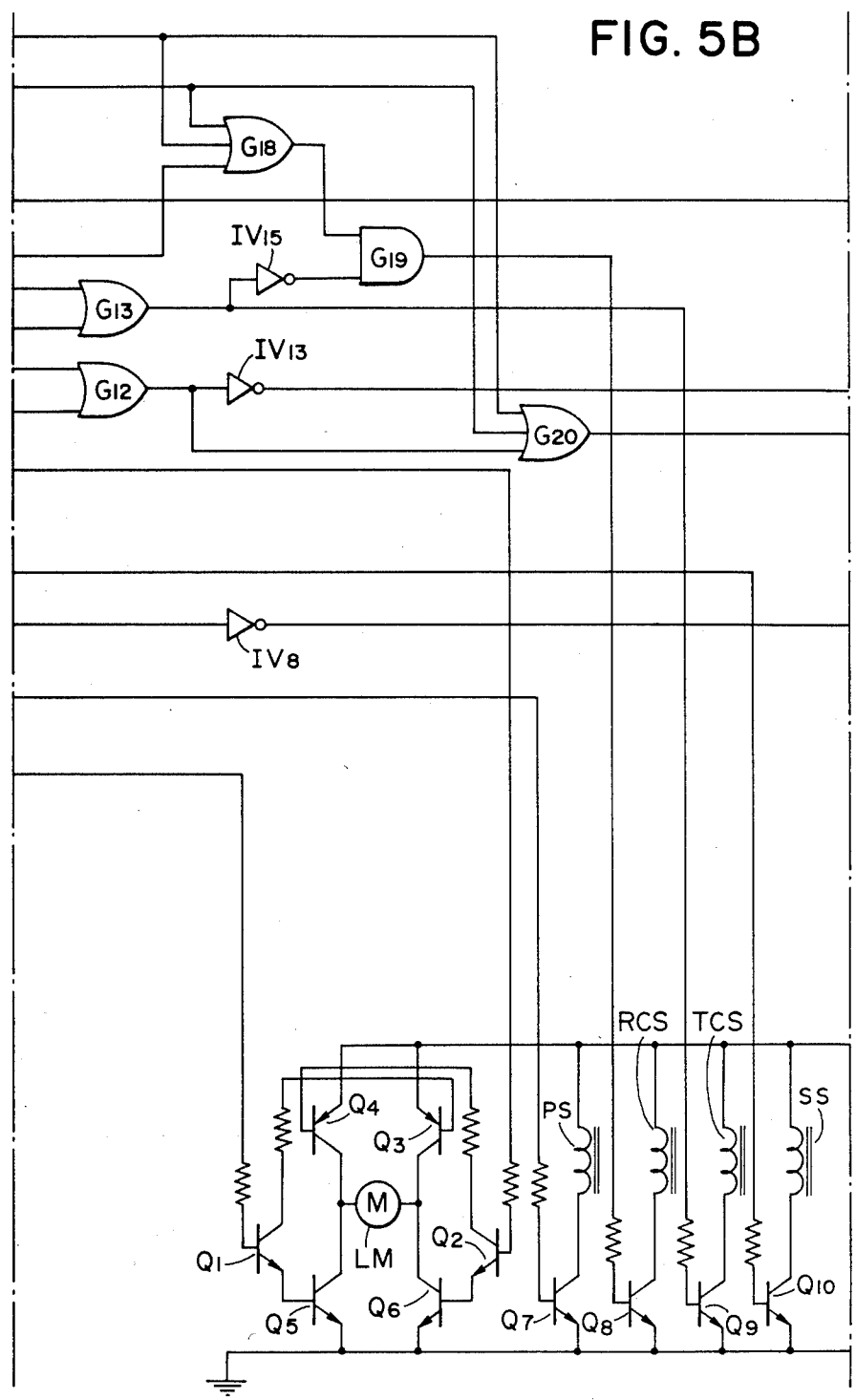
Figure 5C:
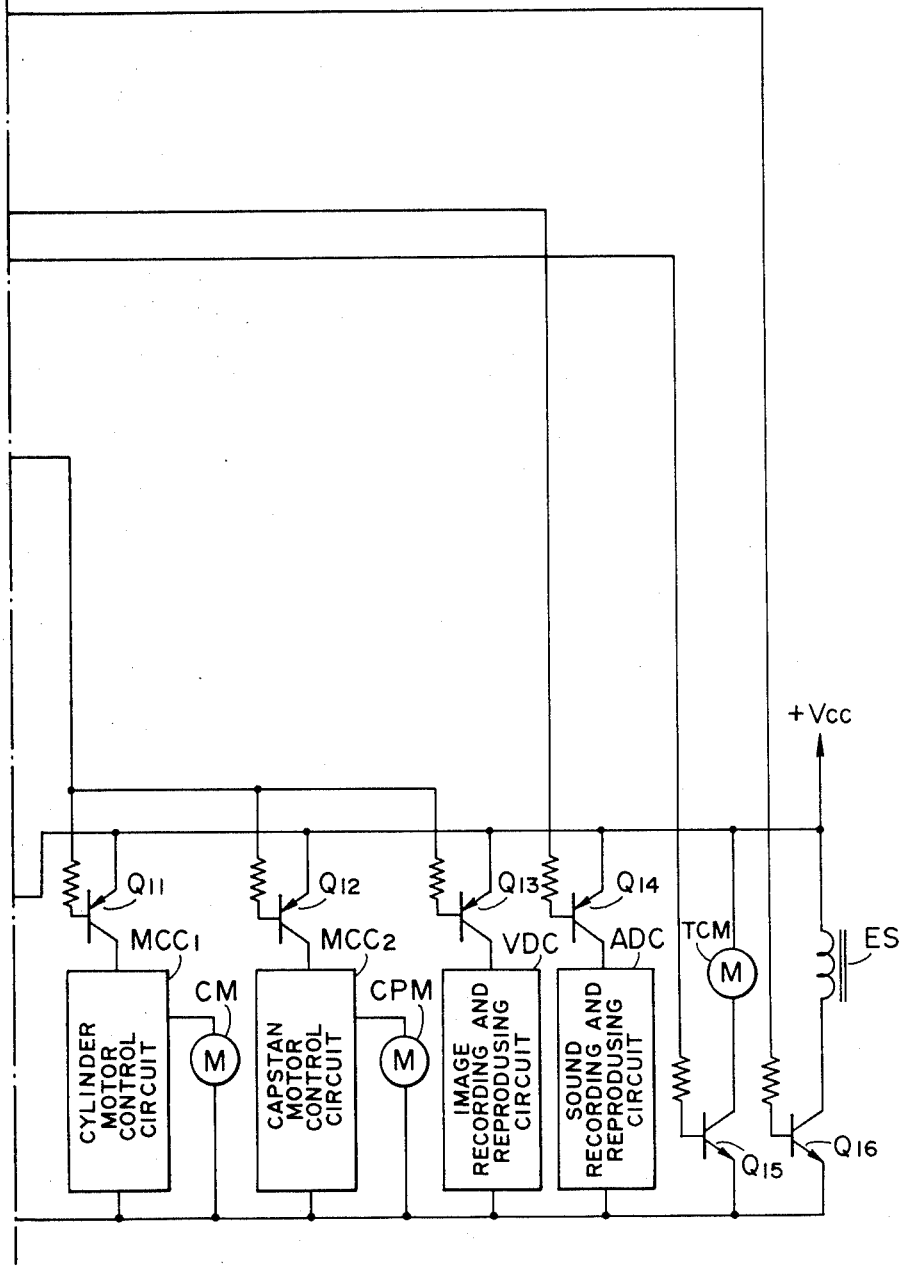

FIG 5C, "REPRODUSING" should read --REPRODUCING-- (both occurrences).

COLUMN 3

Line 36, "former" should read --former recorder--; and

Line 53, "application" should read --Application--.

COLUMN 7

Line 29, "5C)" should read --5(c))--; and

Line 54, "4(a))" should read --4(A))--.

COLUMN 8

Line 10, "SWc" should read --$SW_c$--;

Line 41, "IV6" should read --$IV_6$--;

Line 61, "$SW_8$" should read --$SW_5$--; and

Line 66, "G14" should read --$G_{14}$--.

UNITED STATES PATENT AND TRADEMARK OFFICE
CERTIFICATE OF CORRECTION

PATENT NO. : 4,745,498

DATED : May 17, 1988

INVENTOR(S) : Maeda, et al.

It is certified that error appears in the above-identified patent and that said Letters Patent is hereby corrected as shown below:

COLUMN 12

Line 18, "head 29" should read --head 29,--; and

Line 67, "brush 28d" should read --contact piece 28--.

COLUMN 13

Line 19, "AND gate $G_{18}$" or --OR gate $G_{18}$--.

COLUMN 14

Line 49, "SWR" should read --$SW_R$--.

COLUMN 16

Line 25, "described, the" should read --described and the--.

COLUMN 17

Line 39, "IV12" should read --$IV_{12}$--;

Line 42, "IV6" should read --$IV_6$--;

Line 47, "IV15" should read --$IV_{15}$--;

UNITED STATES PATENT AND TRADEMARK OFFICE
CERTIFICATE OF CORRECTION

PATENT NO. : 4,745,498            Page 3 of 4

DATED : May 17, 1988

INVENTOR(S) : Maeda, et al.

It is certified that error appears in the above-identified patent and that said Letters Patent is hereby corrected as shown below:

Line 48, "G19" should read --$G_{19}$--;

Line 55, "SWFR" should read --$SW_{FR}$--;

Line 56, "IV11 should read --$IV_6$--;

Line 57, "G13" should read --$G_{13}$--;

Line 58, "IV6" should read --$IV_6$--;

Line 60, "G13" should read --$G_{13}$--;

Line 61, "IV15" should read --$IV_{15}$--;

Line 62, "G19" should read --$G_{19}$--; and

Line 68, "IV6" should read --$IV_6$--.

COLUMN 18

Line 1, "G13" should read --$G_{13}$--;

Line 2, "IV15" should read --$IV_{15}$--; and

Lines 24-25, "operated. Whereupon" should read --operated, whereupon--.

COLUMN 19

Line 55, "FIG. 2(b)." should read --FIG. 2(B).--.

UNITED STATES PATENT AND TRADEMARK OFFICE
CERTIFICATE OF CORRECTION

PATENT NO. : 4,745,498

DATED : May 17, 1988

INVENTOR(S) : Maeda, et al.

It is certified that error appears in the above-identified patent and that said Letters Patent is hereby corrected as shown below:

COLUMN 21

Line 32, "information" should read --an information--.

Signed and Sealed this

Fifth Day of September, 1989

Attest:

DONALD J. QUIGG

Attesting Officer

Commissioner of Patents and Trademarks